United States Patent
Gunnalan et al.

(10) Patent No.: US 12,075,132 B2
(45) Date of Patent: *Aug. 27, 2024

(54) ULTRA-LOW LATENCY VIDEO STREAMING

(71) Applicant: Microsoft Technology Licensing, LLC, Redmond, WA (US)

(72) Inventors: Rajesh Gunnalan, Sammamish, WA (US); Mihhail Konovalov, Kirkland, WA (US); Tin Qian, Redmond, WA (US); Satya Sasikanth Bendapudi, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/205,064

(22) Filed: Jun. 2, 2023

(65) Prior Publication Data

US 2023/0308729 A1 Sep. 28, 2023

Related U.S. Application Data

(63) Continuation of application No. 17/670,148, filed on Feb. 11, 2022, now Pat. No. 11,706,497.

(51) Int. Cl.
*H04N 21/647* (2011.01)
*H04N 21/24* (2011.01)

(52) U.S. Cl.
CPC ... *H04N 21/64792* (2013.01); *H04N 21/2407* (2013.01)

(58) Field of Classification Search
CPC ..... H04N 21/23406; H04N 21/234327; H04N 21/234381; H04N 21/2402;
(Continued)

(56) References Cited

U.S. PATENT DOCUMENTS 9,532,062 B2 12/2016 De Cicco et al.
11,706,497 B1 * 7/2023 Gunnalan ...... H04N 21/234327
725/14
(Continued)

OTHER PUBLICATIONS

International Search Report and Written Opinion dated May 12, 2023, from International Patent Application No. PCT/US2022/050815, 21 pp.

(Continued)

*Primary Examiner* — Michael B. Pierorazio
(74) *Attorney, Agent, or Firm* — Klarquist Sparkman, LLP

(57) ABSTRACT

Techniques are described for low-latency streaming of media content using a lossless protocol. For example, a media stream, comprising encoded video data, can be streamed to a plurality of streaming clients via the lossless protocol. The plurality of streaming clients can be monitored to determine whether any of them have fallen behind in streaming the media stream. When a streaming client falls behind, a portion of video data to be streamed to the streaming client can be selectively dropped based on scalability information and/or long term reference (LTR) frame information. The low-latency streaming can be performed without using per-client quality feedback from the plurality of streaming clients. When streaming using a semi-lossy protocol, a plurality of delivery modes can be used, where each delivery mode is for a different type of encoded video data and provides a different level of reliability.

20 Claims, 7 Drawing Sheets

(58) Field of Classification Search
CPC ........... H04N 21/2405; H04N 21/2407; H04N 21/643; H04N 21/64792
See application file for complete search history.

(56) References Cited

U.S. PATENT DOCUMENTS

| | | |
|---|---|---|
| 2007/0276954 A1 | 11/2007 | Chan et al. |
| 2009/0228946 A1 | 9/2009 | Perlman et al. |
| 2010/0172278 A1* | 7/2010 | Nishio .................. H04W 52/42 370/312 |
| 2010/0172286 A1* | 7/2010 | Yoshii .................... H04J 11/005 370/328 |
| 2011/0225315 A1 | 9/2011 | Wexler et al. |
| 2013/0262695 A1 | 10/2013 | Friedrichsen et al. |
| 2015/0195561 A1* | 7/2015 | Wang .................... H04N 19/33 375/240.16 |
| 2016/0036673 A1 | 2/2016 | Meirosu et al. |
| 2016/0350056 A1* | 12/2016 | Makar .................. G06F 3/1454 |
| 2017/0041238 A1 | 2/2017 | Do et al. |
| 2017/0222936 A1 | 8/2017 | Al-Roubaiey et al. |
| 2018/0084020 A1 | 3/2018 | Li et al. |
| 2021/0209807 A1* | 7/2021 | Oh ....................... H04N 19/597 |
| 2022/0006999 A1* | 1/2022 | Oh ......................... H04L 65/70 |
| 2022/0394073 A1 | 12/2022 | Burke et al. |

OTHER PUBLICATIONS

Invitation to Pay Additional Fees dated Mar. 16, 2023, from PCT Application No. PCT/US22/050815, 11 pp.
Notice of Allowance dated Mar. 2, 2023, from U.S. Appl. No. 17/670,148, 8 pp.
Van der Stok et al., "Hierarchical Resource Allocation for Robust in-home Video Streaming," *The Journal of Systems and Software*, vol. 80, Issue 7, pp. 951-961 (May 2007).
U.S. Appl. No. 17/670,148, filed Feb. 11, 2022.
Applicant-Initiated Interview Summary for U.S. Appl. No. 17/970,148, filed Oct. 31, 2022, 3 pages.
"Improve Encoding Efficiency and Video Quality with Adaptive LTR," Feb. 22, 2018, 8 pages.
Reference Frame (video), Wikipedia, May 23, 2021, 2 pages.
Scalable Video Coding, Wikipedia, Jul. 4, 2021, 5 pages.
Non-Final Office Action received in U.S. Appl. No. 17/949,869, dated Feb. 16, 2023, 15 pages.
Non-Final Office Action received in U.S. Appl. No. 17/670,148, dated Sep. 29, 2022, 13 pages.

* cited by examiner

ULTRA-LOW LATENCY VIDEO STREAMING

CROSS REFERENCE TO RELATED APPLICATIONS

This application is a continuation of U.S. patent application Ser. No. 17/670148, filed Feb. 11, 2022, the disclosure of which is hereby incorporated by reference.

BACKGROUND

Media streaming solutions for media content use lossless network protocols for media delivery over the network. Common media streaming solutions include HTTP live streaming (HLS) and dynamic adaptive streaming over HTTP (DASH). Such media streaming solutions typically deliver the media content as files. The dependency on lossless protocols and the usage of files for delivery of the media content results in latency that is high or very high depending on the underlying conditions (e.g., network conditions). For example, if the network experiences a burst loss of a few seconds, then the streaming clients will lag behind a real-time media stream by a corresponding amount.

Because such media streaming solutions are not able to drop media content, the streaming clients will continue to lag behind the real-time media stream even further (e.g., with each occurrence of network loss). If the real-time stream is an online meeting, this issue precludes any kind of meaningful interaction with the presenter.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for low-latency streaming of media content using a lossless protocol. For example, operations can be performed for streaming a media stream, comprising encoded video data, to a plurality of streaming clients via the lossless protocol. The operations can further comprise determining whether any of the plurality of streaming clients has fallen behind in streaming the media stream. The operations can further comprise, upon determining that a streaming client has fallen behind, selectively dropping a portion of video data to be streamed to the streaming client, where the selectively dropping the portion of the video data is performed based on at least one of scalability information of the video data or long term reference (LTR) frame information of the video data. The technologies for low-latency streaming of media content using the lossless protocol are performed without using per-client quality feedback from the plurality of streaming clients. For example, the determination of whether any of the plurality of streaming clients has fallen behind the media stream is performed without using per-client quality feedback from the plurality of streaming clients.

Technologies are described for low-latency streaming of media content using a semi-lossy protocol. For example, operations can be performed for streaming a media stream, comprising encoded video data, to a plurality of streaming clients via the semi-lossy protocol, where the semi-lossy protocol uses a plurality of delivery modes for corresponding different types of encoded video data, and where each of the plurality of delivery modes provides a different level of reliability. Streaming of the media stream can comprise transmitting a first type of encoded video data to the plurality of streaming clients using a first delivery mode, where the first delivery mode uses a first number of retries. Streaming the media stream can further comprise transmitting a second type of encoded video data to the plurality of streaming clients using a second delivery mode, where the second delivery mode uses a second number of retries different from the first number of retries. The streaming is performed without using per-client quality feedback from the plurality of streaming clients.

DETAILED DESCRIPTION

Overview

Figure 1:
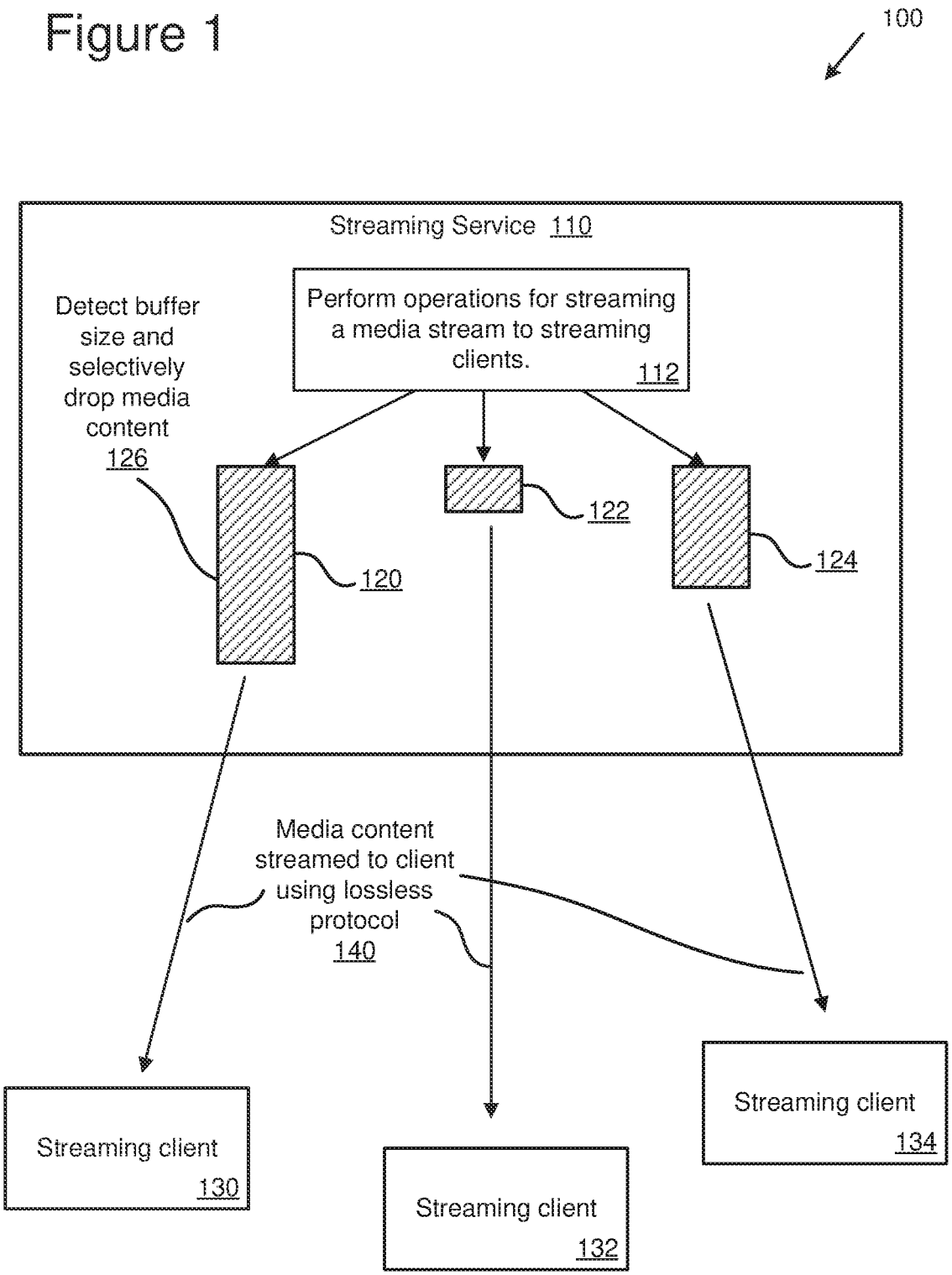
FIG. 1 is a block diagram depicting example environment for low-latency streaming of media content using a lossless protocol.

The following description is directed to technologies for low-latency streaming of media content using a lossless protocol. For example, a media stream, comprising encoded video data, can be streamed to a plurality of streaming clients via the lossless protocol. The plurality of streaming clients can be monitored to determine whether any of them have fallen behind in streaming the media stream. When a streaming client falls behind, a portion of video data to be streamed to the streaming client can be selectively dropped based on scalability information and/or long term reference (LTR) frame information. The low-latency streaming can be performed without using per-client quality feedback from the plurality of streaming clients. When streaming using a semi-lossy protocol, a plurality of delivery modes can be used, where each delivery mode is for a different type of encoded video data and provides a different level of reliability.

The technologies described herein can be used to efficiently (e.g., with low overhead) stream audio and/or video content to streaming clients with low latency. The technologies described herein provide various advantages over existing streaming solutions (e.g., existing content delivery network (CDN) solutions), including existing streaming solutions that organize streaming content into chunks for streaming (also referred to as file-based streaming or segment-based streaming). With existing solutions that organize streaming content into chunks, a lossless protocol is used that ensures delivery of the streaming content. However, such existing solutions suffer from problems when streaming media content in a real-time environment (e.g., a broadcast or online meeting). For example, because existing streaming solutions do not drop media content, clients can fall behind the stream (e.g., by a number of seconds or minutes). As a result, meaningful interaction (e.g., chatting, polls, etc.) on the part of the clients may be difficult or impossible.

In some implementations, video coding technologies are used to provide low-latency streaming of media content using lossless protocols. A first collection of video coding technologies is related to scalability. With scalability, the encoded video content includes one or more subsets, which can be referred to as layers. One or more of the layers can be dropped to reduce bandwidth (e.g., thereby reducing resolution, reducing frame rate, and/or lowering quality). One type of scalability is temporal scalability. Temporal scalability deals with frame rate. With temporal scalability, motion compensation dependencies are structured so that video data (e.g., complete pictures) can be dropped form the bitstream (e.g., pictures organized into a layer structure). Temporal scalability is provided by a number of video coding standards, including H.264 and VP8. A second type of scalability is spatial scalability. With spatial scalability, video is coded at multiple spatial resolutions. The decoded video data of lower resolutions can be used to predict decoded video data of higher resolutions to reduce the bit rate. A third type of scalability is quality scalability. With quality scalability, the video is coded at a single spatial resolution but at different qualities. The decoded video data of lower qualities can be used to predict decoded video data of higher qualities to reduce the bit rate. In some implementations, a combination of scalability techniques can be applied, including temporal scalability, spatial scalability, quality scalability, and/or other types of scalability. A specific implementation of scalability is the scalable video coding (SVC) standard, which can utilize temporal scalability, spatial scalability, and/or quality scalability.

A second video coding technology that is used to provide low latency streaming of media content using lossless protocols is the use of long-term reference (LTR) frames. LTR frames can be used to improve the quality of subsequent predicted frames and to compensate for dropped video content.

The use of scalability and/or LTR frame technologies when streaming encoded media content provide improvements and advantages. For example, streaming can be performed while maintaining low latency (e.g., less than one second of latency) by selectively dropping encoded media content when needed (e.g., when network latency and/or packet loss cause a buildup of encoded media content waiting to be transmitted to the streaming client). In some implementations, using scalability technologies and/or LTR frame technologies allow selected encoded video content to be dropped during streaming to reduce latency and without significantly affecting playback quality at the streaming client.

The technologies described herein provide an unconventional solution to streaming of media content. Specifically, scalability and LTR frame technologies are typically used in the real-time conferencing domain which uses lossy protocols and tailors the conference on a per-client basis (e.g., based on per-client quality feedback from the clients). However, instead of real-time conferencing, the technologies described herein use scalability and/or LTR frame technologies when streaming media content using a lossless (or semi-lossy) protocol. This technology allows streaming to performed with low latency (by selectively dropping media content when a client has fallen behind) and to scale to a large number of streaming clients (e.g., hundreds of thousands or more).

Terminology

The term "media content" refers to encoded audio and/or video content. The encoded audio and/or video content contains a sequence of encoded audio and/or video frames (e.g., comprising corresponding audio and/or video samples). The encoded audio and/or video frames are encoded via a corresponding audio and/or video codec.

The term "streaming" refers to transmitting media content, as a media stream, from a first computing device to a second computing device via a computer network.

The term "lossless protocol" refers to one or more network protocols that provide for reliable transmission of data over a computer network from a first computing device (e.g., a server) to a second computing device (e.g., a client). When data fails to reach the destination computing device, the lossless protocol retransmits the data until it is successfully received (thus providing reliable transmission). Examples of lossless protocols include transmission control protocol (TCP), hypertext transfer protocol (HTTP), HTTP live streaming (HLS), and dynamic adaptive streaming over HTTP (DASH). In some implementations, a lossless transport protocols, such as TCP, is used to ensure reliable transmission of data to the client.

The term "semi-lossless protocol" refers to one or more network protocols that provide semi-reliable transmission of data over a computer network from a first computing device (e.g., a server) to a second computing device (e.g., a client). Semi-lossless protocols can provide different levels of reliability (e.g., different delivery modes).

The term "streaming client" refers to a client that receives streaming audio and/or video data. For example, a streaming client can be a software application running on a computing device (e.g., laptop or desktop computer, tablet, smart phone, or another type of computing device) that decodes and presents (e.g., via audio and/or video playback) the received media stream.

Example Media Streams and Logical Buffers

In the technologies described herein, media content is delivered to clients as a media stream (e.g., as a real-time media stream). For example, the media content of the media stream is available for delivery to the clients in real-time.

Due to the various network conditions that exist between the server and the clients, each client may be at a different position in the media stream. For example, a first client may be up-to-date (e.g., there is no media content waiting to be delivered to the first client) while a second client could have fallen behind (e.g., there is five seconds of media content waiting to be delivered to the second client).

In some implementations, each client (also referred to as a streaming client) has an associated logical buffer (also referred to as a buffer) that indicates the client's position in the media stream. In other words, the logical buffer contains the amount of media content that is waiting to be delivered to the client. In this way, the logical buffer also indicates whether a client has fallen behind the media stream. For example, if a given client has 10 seconds of media content in the client's logical buffer that has not yet been delivered to the given client, then the given client has fallen behind the media stream by 10 seconds. The logical buffers can be implemented in various ways. For example, a single memory buffer of media data can be maintained along with a location of each client's position in the single memory buffer. In some implementations, the collection of logical buffers for the streaming clients is referred to as a queue of buffers.

Environments for Low-Latency Streaming of Media Content Using Lossless Protocols FIG. 1 is a diagram depicting example environment 100 for low-latency streaming of media content using a lossless protocol. The example environment 100 includes a streaming service 110. The streaming service 110 provides media content for streaming to streaming clients, including streaming clients 130, 132, and 134. The streaming service 110 can be implemented using various types of software and/or hardware computing resources, such as server computers, cloud computing resources, audio and/or video coding software, streaming software, etc.

The streaming service 110 performs various operations for streaming a media stream to streaming clients, as depicted at 112. For example, the operations can comprise receiving audio and/or video data (e.g., samples), encoding the audio and/or video data using various audio and/or video codecs, transmitting network packets containing encoded audio and/or video data to streaming clients using lossless protocols, managing buffers of encoded audio and/or video data, and/or selectively dropping audio and/or video data based on various criteria (e.g., buffer size).

In this example, the streaming service 110 is providing a media stream to three streaming clients, streaming client 130, streaming client 132, and streaming client 134. The streaming service 110 maintains a buffer (also referred to as a logical buffer) for each streaming client. Specifically, streaming client 130 is associated with buffer 120, streaming client 132 is associated with buffer 122, and streaming client 134 is associated with buffer 124. Each buffer indicates the encoded audio and/or video data waiting to be delivered to its respective streaming client.

The media stream has a current (most up-to-date) position, which is at the head of the stream (e.g., the current position in a real-time media stream). The head of the stream is represented by the top of the buffers 120, 122, and 124. As the media stream produces new audio and/or video data, it is encoded and added to the top of the buffers, as depicted by the arrows entering the buffers 120, 122, and 124. The position of a given streaming client in its corresponding buffer is represented by the bottom of its corresponding buffer (also referred to as the tail). The amount of encoded audio and/or video data in a given buffer indicates how far behind that streaming client is in the media stream. In other words, the location in the buffer of a given streaming client indicates how far behind the given streaming client is in the media stream. For example, if buffer 120 represents seven seconds of encoded audio and/or video data waiting to be delivered to streaming client 130, then streaming client 130 is seven seconds behind in the media stream.

The streaming service 110 selectively drops media content when a given streaming client is determined to have fallen behind in streaming the media stream. For example, streaming client 130 has fallen behind in the media stream due to the size of its associated buffer 120, as depicted at 126 (e.g., the buffer 120 could indicate that seven seconds of encoded audio and/or video data has been queued up and is waiting to be delivered to streaming client 130, which is over a threshold of five seconds). A given streaming client can be considered to have fallen behind (e.g., as a condition) based on various criteria, such as the amount encoded audio and/or video data in its buffer (e.g., based on number of frames or other measure) and/or the amount of time represented by the encoded audio and/or video data in its buffer (e.g., a number of seconds of playback represented by the encoded audio and/or video data in the buffer).

The streaming service 110 can determine whether a given streaming client has fallen behind by monitoring the buffers (e.g., by monitoring buffers 120, 122, and 124). The streaming service 110 can monitor the buffers on a continuous or periodic basis. Based on the monitoring, the streaming service 110 can determine when a streaming client has fallen behind. In some implementations, when a buffer indicates more than a threshold amount of encoded audio and/or video data (or corresponding playback time), the streaming service 110 determines that the streaming client associated with the buffer has fallen behind.

When the streaming service 110 determines that a given streaming client has fallen behind in streaming the media stream (e.g., when there is more than a threshold amount of encoded audio and/or video data in the given streaming client's buffer), then the streaming service 110 selectively drops audio and/or video data to be streamed to the streaming client.

When the streaming service 110 selectively drops audio and/or video data, it drops a portion of the audio and/or video data that would otherwise be streamed to the streaming client. For video data, the streaming service 110 selects the portion to drop based on scalability information (e.g., dropping one or more layers) and/or long term reference (LTR) frame information (e.g., dropping one or more frames). For audio data, the streaming service 110 can adjust the forward error correction (FEC) reliability level (e.g., which results in dropping redundant audio data that would otherwise be transmitted to a streaming client). For example, if there are multiple network connections between the streaming service 110 and a given streaming client, then audio data for one or more of the network connections (e.g., redundant audio data) can be dropped.

The streaming service 110 operates without using per-client quality feedback from the streaming clients (e.g., from streaming clients 130, 132, and 134). For example, when the streaming service 110 determines whether a given streaming client has fallen behind in streaming the media stream, the streaming service 110 does so without using quality feedback from the streaming clients (e.g., the streaming clients do not send any information to the streaming service indicating that the streaming clients are experiencing network loss or delay, or decoding slowdown). In some implementations, the streaming service 110 uses only server-side streaming information when determining whether any of the plurality of streaming clients has fallen behind. For example, the server-side streaming information can include the condition of the buffers (e.g., how much encoded media data is in a given buffer waiting to be streamed), network statistics (e.g., packet delivery statistics or loss statistics observed by the streaming service 110), and/or other information that is observed by the streaming service 110, but that is not received from the streaming clients.

In some implementations, the streaming service 110 selectively drops video data when a streaming client has fallen behind based, at least in part, on scalability information. For example, the streaming service 110 can drop one or more layers of video data defined by the temporal scalability information, spatial scalability information, and/or quality scalability information (e.g., by dropping one or more layers other than a base layer). In some implementations, the scalability information is defined according to the scalable video coding (SVC) standard.

In some implementations, the streaming service 110 selectively drops video data when a streaming client has fallen behind based, at least in part, on LTR frame information. For example, the LTR frame information can indicate a dependency structure of frames (e.g., comprising instantaneous decoder refresh (IDR) frames, LTR frames, predicted (P) frames, and/or other types of frames). Depending on the LTR frame information, certain frames could be dropped (e.g., predicted frames).

In some implementations, the streaming service 110 selectively drops video data when a streaming client has fallen behind based, at least in part, on both scalability information and LTR frame information. For example, one or more layers can be dropped where the layers are scalability layers that are defined according to LTR frame information (e.g., that have a particular LTR dependency structure of frames).

Figure 2:
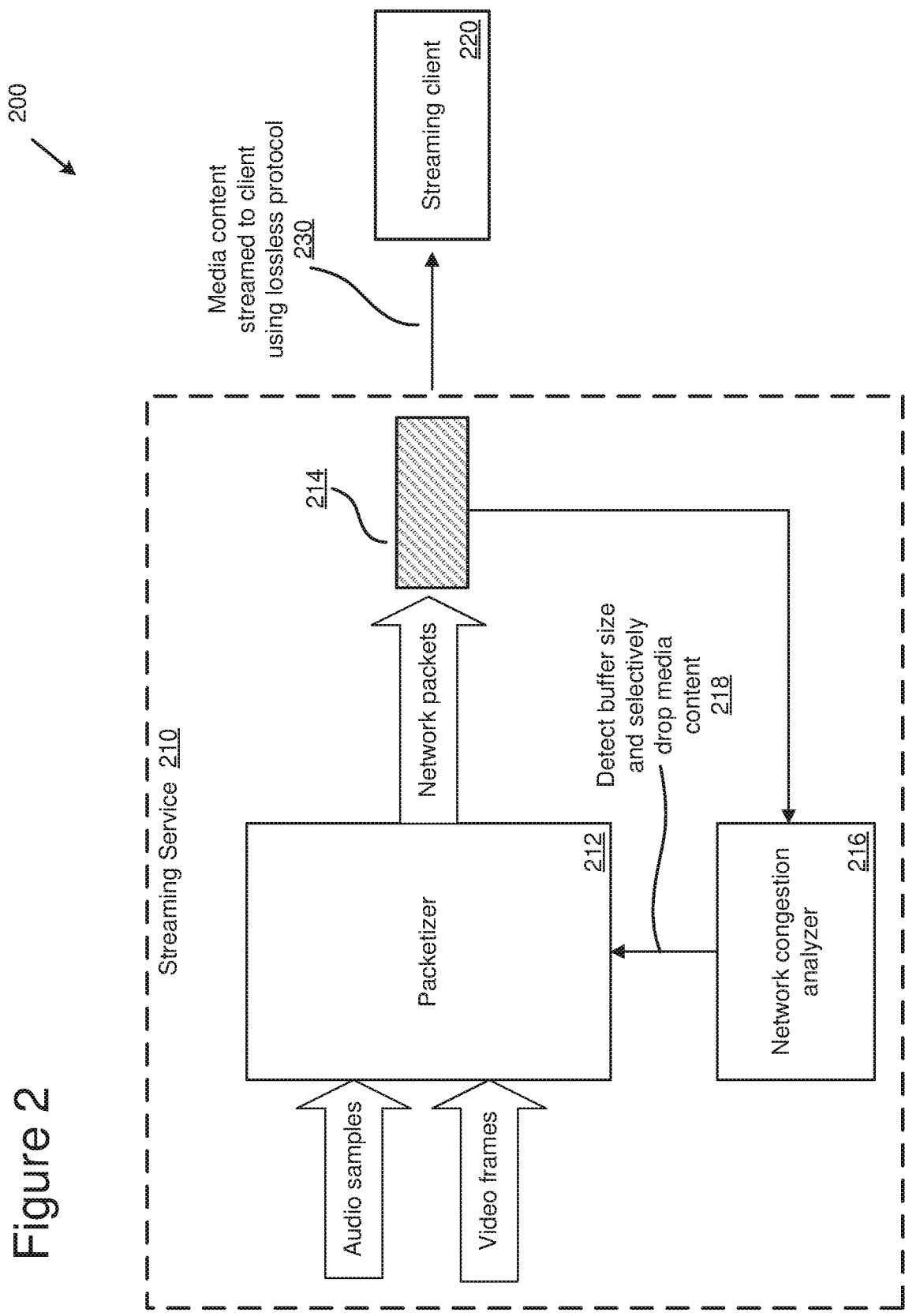
FIG. 2 is a diagram depicting an example environment for selectively dropping media content when performing low-latency streaming using a lossless protocol.

FIG. 2 is a diagram depicting example environment 200 for selectively dropping media content when performing low-latency streaming using a lossless protocol. The example environment 200 includes a streaming service 210. The streaming service 210 provides media content for streaming to streaming clients, including streaming 220. The streaming service 210 can be implemented using various types of software and/or hardware computing resources, such as server computers, cloud computing resources, audio and/or video coding software, streaming software, etc.

As depicted in the example environment 200, a packetizer 212 receives a media stream as a sequence of encoded audio samples and/or video frames and generates network packets. The network packets are saved in a buffer 214 for sending to the streaming client 220. The streaming service 210 delivers the network packets from the buffer 214 to the streaming client 220 (e.g., as fast as possible) using a lossless protocol, as depicted at 230. Depending on various factors, such as network conditions, the number of network packets (and the corresponding amount of encoded audio and/or video data) in the buffer 214 may grow or shrink.

As depicted in the example environment 200, the streaming service 210 includes a network congestion analyzer 216. The network congestion analyzer 216 analyzes the buffer 214 to determine whether the streaming client 220 has fallen behind (e.g., whether there is more than a threshold amount of encoded audio and/or video data in the buffer 214 waiting to be sent to the streaming client 220).

When the streaming client 220 has fallen behind, the network congestion analyzer 216 signals the packetizer 212 to selectively drop media content (also referred to as throttling), as depicted at 218. For example, throttling can be performed by selectively dropping non-essential scalability (e.g., SVC) layers. In some implementations, there are multiple layers, one or more of which can be dropped based on various criteria (e.g., based on the amount data in the buffer 214 and/or other criteria, such as how fast the buffer 214 is growing).

When the streaming client 220 has caught up (e.g., when the amount of data in the buffer 214 falls below the threshold), the media stream can be restored to its original state (e.g., media data will no longer be dropped). However, if a long-term network condition (e.g., bandwidth limitation) is detected, then long-term changes can be made to the media stream. For example, the streaming client 220 can be moved to a different pre-defined media stream that is encoded at a lower video resolution and/or at a lower frame rate.

The example environment 200 depicts one way of implementing the streaming service 210. Other implementations could use different components (e.g., components for encoding audio and/or video data, components for generating network packets, components for monitoring buffer conditions, components for transmitting network packets, components for selectively dropping media data, and/or other components). In some implementations, the streaming service 110 uses the components depicted for the streaming service 210.

The example environment 200 depicts one streaming client 220 and its associated buffer 214 for ease of illustration. However, the example environment 200 supports any number of streaming clients and associated buffers.

In some implementations, streaming is performed (e.g., within example environments 100 or 200) by streaming a sequence of encoded audio and/or video frames without grouping frames into chunks for delivery. In other words, the streaming clients receive the encoded audio and/or video data without sending requests for a next chunk of streaming content (as would normally be done with a content delivery network). As a result, streaming is performed with low overhead and very low latency (e.g., no requests from the streaming clients for subsequent chunks of streaming content).

In the streaming technologies described herein, the media streams that are streamed to the streaming clients are not specific to any given streaming client. In other words, the streaming client does not negotiate streaming parameters that are specific to the streaming client. However, a number of pre-defined media streams (e.g., with varying quality and configuration) can be provided by a streaming service (by streaming service 110 or 210), and the streaming service can assign streaming clients to one of the available pre-defined media streams.

Using the techniques described above with regard to the example environments 100 and/or 200, streaming of audio and/or video content can be performed to many streaming clients (e.g., 100,000 or more streaming clients) efficiently and with low latency (e.g., with less than one-second of latency). Low latency can be maintained by selectively dropping audio and/or video data when a streaming client falls behind. Therefore, using the techniques described herein, the streaming environment can support virtually any number of streaming clients while still allowing the streaming clients to have meaningful interaction or engagement with the streaming media content if desired (e.g., if the streaming media content is part of a real-time meeting, then streaming clients could interact with the meeting participants in real-time).

In some implementations, a plurality of network connections (e.g., a plurality of TCP connections) are used for streaming media content to a given streaming client. The plurality of network connections can comprise one or more reliable, semi-reliable, and/or non-reliable network connections (also referred to as network channels). For example, a first network connection that provides a higher level of reliability (e.g., with more retries) can be used to deliver higher priority media content (e.g., base layer content) while a second network connection that provides a lower level of reliability (e.g., with fewer retries) can be used to deliver lower priority media content (e.g., layers other than the base layer). In some implementations, multiple network connections (e.g., two or more) are used for streaming media content, each with their own reliability level (e.g., number of retries) and configuration (e.g., forward error correction (FEC) configuration).

In some implementations, quality can be improved by using multiple network connections. For example, if the same content (e.g., encoded audio and/or video data) is sent via multiple connections, then the content that arrives first can be utilized, thus reducing latency. In some implementations, redundant media content is distributed among multiple connections (e.g., in a round robin manner or using another distribution scheme). Such solutions can reduce latency (e.g., by using the first arriving copy of the media content) and/or improve reliability (e.g., if a given network connection is degraded or fails).

In some implementations, the number of network connections is dynamically determined based on various criteria. For example, the number of network connections can be dynamical determined (and dynamically varied) based on parameters such as round-trip-time (RTT), profile information (e.g., location, network type, etc.), machine learning models, etc.

In some implementations, streaming begins with a single network connection, and upon detecting poor network conditions, multiple network connections are enabled.

Example Layer Configurations

In the technologies described herein, video data is selectively dropped when a streaming client has fallen behind based, at least in part, on scalability information (e.g., temporal scalability information, spatial scalability information, and/or quality scalability information) and/or LTR frame information. For example, a configuration of scalability layers (e.g., SVC layers) can be used in which the video frames are also organized according to LTR frame information. One or more of the scalability layers can then be dropped when streaming to a streaming client that has fallen behind in streaming the media stream.

To enable dropping of layers when streaming media content, scalability uses the concept of layers. Depending on the configuration, video frames of a layer can be dropped without significantly affecting video quality. For example, layers can be encoded with different frame rates, resolutions, or other encoding parameters.

LTR frame information can be used when creating a layer configuration by defining a dependency chain of frames (also referred to as a dependency structure) for the various layers. If any of the P frames are not received, video playback can be recovered at the next LTR frame. Depending on the frequency of LTR frames, recovery may be unnoticeable or almost unnoticeable.

Figure 3:
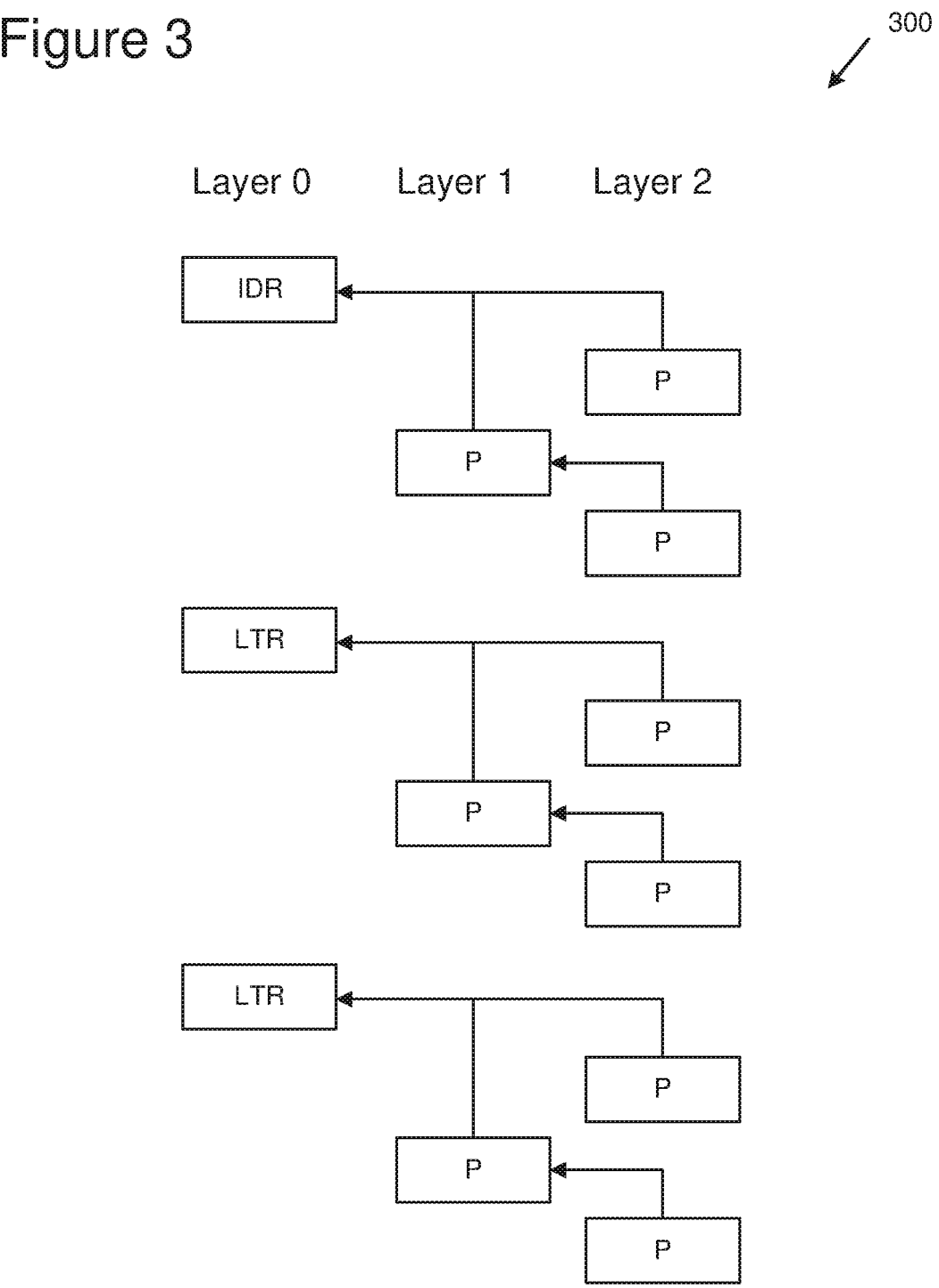
FIG. 3 is a diagram depicting an example layer configuration for streaming video data that supports selectively dropping layers when performing low-latency streaming.

FIG. 3 is a diagram depicting an example layer configuration 300 for streaming video data that supports selectively dropping layers when performing low-latency streaming using a lossless protocol. The example layer configuration 300 has three layers: layer 0, layer 1, and layer 2. Layer 0 is the base layer and contains an IDR frame and two LTR frames. Layer 1 contains P frames with a specific dependency structure. Layer 2 also contains P frames with a specific dependency structure.

Using the example layer configuration 300, the video content of a media stream can be selectively dropped in an incremental fashion when a streaming client falls behind. For example, if a streaming client has fallen behind, layer 2 can be dropped, which still allows the streaming client to decode and play the video content with reasonable quality. The following streaming options are available using the example layer configuration 300.

Layer 0+layer 1+layer 2, maximum quality playback (e.g., 30 frames per second (FPS))

Layer 0+layer 1, reduced quality playback (e.g., 15 FPS)

Layer 0, further reduced playback (e.g., 7.5 FPS)

The example layer configuration 300 is just one example layer configuration that can be used for streaming data that supports selectively dropping layers. Other configurations can use a different number of layers and/or different frame dependency (e.g., a different arrangement and/or frequency of IDR frames, LTR frames, P frames, and/or different frame types).

Low-Latency Streaming of Media Content Using Semi-Reliable Modes

In some implementations, media content is streamed using a protocol that provides semi-reliable network packet delivery (also referred to as a semi-lossy protocol). Examples of protocols that provide semi-reliable network packet delivery include stream control transmission protocol (SCTP) and QUIC.

In a non-reliable mode, a network packet is delivered without retries. With semi-reliable modes, there is a limit placed on the total number of retries and/or the delivery attempt timeout. Therefore, semi-reliable modes provide better delivery probability than the non-reliable mode, but at the cost of potential additional latency.

In some implementations, the streaming service (e.g., streaming service 110 or 210) streams the media stream using a semi-lossy protocol instead of a lossless protocol. For example, when streaming using the SCTP protocol, the streaming service controls the nature of the semi-reliable delivery and applies different delivery modes based on the type of video content being streamed. In some implementations, the streaming service applies a first delivery mode when streaming independent video frames (e.g., I frames, LTR frames, and/or other types of independent frames) and a second delivery mode when streaming delta video frames (e.g., P frames). For example, the first delivery mode can perform up to five retries when delivering independent video frames to the streaming client, while the second delivery mode only tries once when delivering delta frames to the streaming client. Other implementations can use a different number of delivery modes (e.g., more than two delivery modes), each delivery mode for one or more specific types of video frames and having its own reliability properties.

In some implementations, streaming is performed using a semi-lossy protocol based on a layer configuration (e.g., based on the example layer configuration 300). For example, a first layer (e.g., layer 0) can be delivered with higher reliability (e.g., with more retries), while other layers (e.g., layers 1 and 2) are delivered with lower reliability (e.g., with fewer or no retries).

In some implementations, a plurality of network connections are used for streaming media content to a given streaming client. The plurality of network connections can comprise one or more reliable, semi-reliable, and/or non-reliable network connections. For example, a first network connection that provides a higher level of reliability (e.g., with more retries) can be used to deliver higher priority media content (e.g., base layer content) while a second network connection that provides a lower level of reliability (e.g., with fewer retries) can be used to deliver lower priority media content (e.g., layers other than the base layer). In some implementations, multiple network connections (e.g., two or more) are used for streaming media content, each with their own reliability level (e.g., number of retries) and configuration.

When using a semi-lossy protocol, the streaming client may receive packets out of order. Therefore, the streaming client can collect audio and/or video data in a jitter buffer. The size of the streaming client's jitter buffer can be adjusted based on network conditions.

Methods for Low-Latency Streaming of Media Content

In any of the examples herein, methods can be provided for low-latency streaming of media content using lossless and/or semi-lossy protocol. Low-latency streaming can be implemented in a real-time streaming environment by selectively dropping media content when a streaming client has fallen behind (e.g., based on monitoring buffers).

Figure 4:
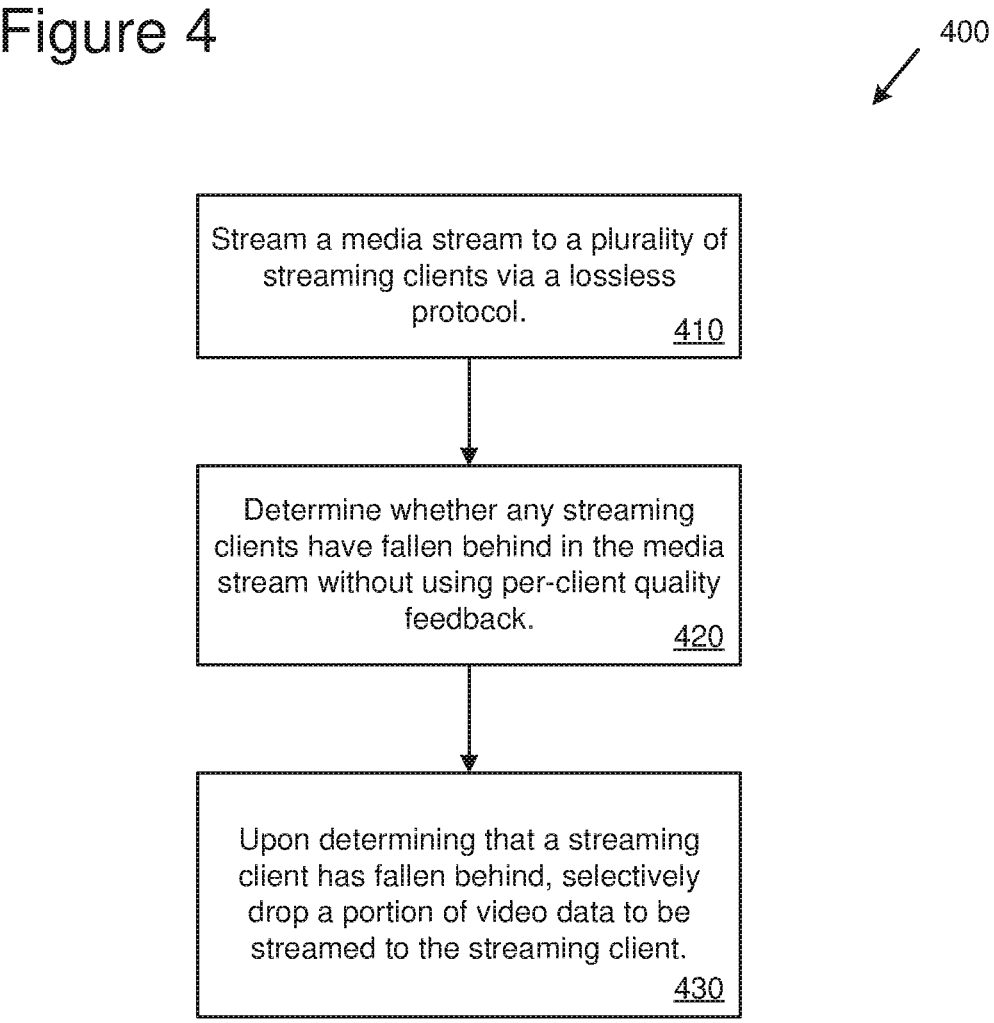
FIG. 4 is a flowchart of an example method for low-latency streaming of media content using a lossless protocol.

FIG. 4 is a is a flowchart of an example method 400 for low-latency streaming of media content using a lossless protocol. For example, the example method 400 can be performed by a streaming service, such as streaming service 110 or streaming service 210.

At 410, a media stream is streamed to a plurality of streaming clients using a lossless protocol. The media stream comprises encoded video data. The media stream can also comprise encoded audio data.

At 420, the status of the streaming clients is checked to determine whether any of the streaming clients have fallen behind in streaming the media stream. For example, the streaming client buffers can be monitored to determine how much encoded video data is waiting to be delivered. When the amount of streaming data in a given streaming client's buffer is over a threshold value, the given streaming client can be determined to have fallen behind. The determination is made without using per-client quality feedback from the streaming clients.

At 430, upon determining that a streaming client has fallen behind, a portion of video data to be streamed to the streaming client is selectively dropped. The selective dropping is performed based on scalability information and/or LTR frame information of the video data.

In some implementations, one or more scalability layers are dropped. In some implementations, both scalability information and LTR frame information are used to determine the portion of video data to selectively drop (e.g., based on a layer configuration that is also defined by an LTR frame dependency structure).

In some implementations, the example method 400 selectively drops audio content (e.g., in addition to selectively dropping video content). For example, when a streaming client has fallen behind (e.g., based on monitoring a buffer indicating encoded audio content to be delivered to the streaming client), audio content (e.g., redundant audio content) that would otherwise be streamed to the streaming client can be dropped (not transmitted to the streaming client). In some implementations, the selective dropping for audio content is performed by adjusting an FEC reliability level of audio data to be streamed to the streaming client.

Figure 5:
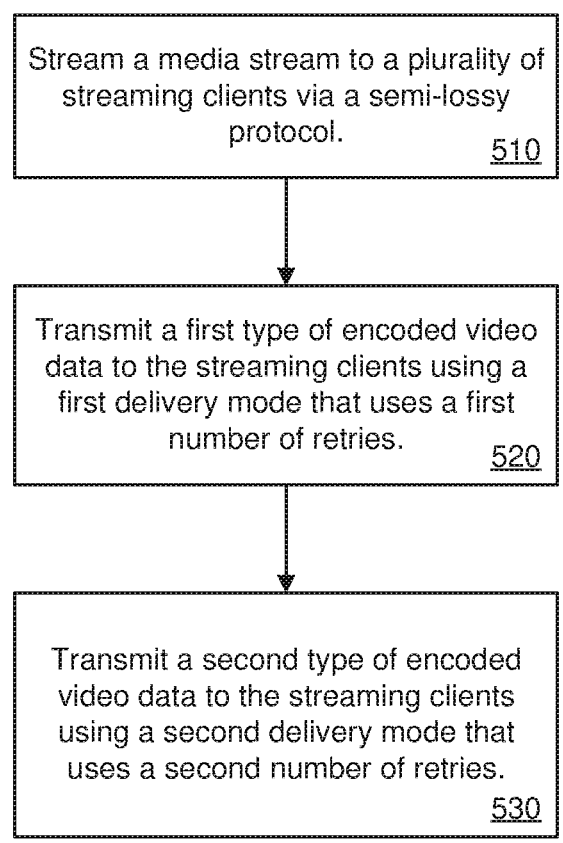
FIG. 5 is a flowchart of an example method for low-latency streaming of media content using a semi-lossy protocol.

FIG. 5 is a is a flowchart of an example method 500 for low-latency streaming of media content using a semi-lossy protocol. For example, the example method 500 can be performed by a streaming service, such as streaming service 110 or streaming service 210.

At 510, a media streamed is streamed to a plurality of streaming clients using a semi-lossy protocol. The semi-lossy protocol uses a plurality of delivery modes for corresponding different types of encoded video data, where each of the plurality of delivery modes provides a different level of reliability. The media stream comprises encoded video data. The media stream can also comprise encoded audio data.

At 520, a first type of encoded video data is transmitted to the streaming clients using a first delivery mode. The first delivery mode uses a first number of retries. In some implementations, the first type of encoded video data is independent video frames (e.g., IDR frames, LTR frames, I frames, and/or other types of independent video frames).

AT 530, a second type of encoded video data is transmitted to the streaming clients using a second delivery mode. The second delivery mode uses a second number of retries different from the first number of retries. In some implementations, the second type of encoded video data is delta video frames (e.g., P frames, B frames, and/or other types of delta video frames). In some implementations, the first number of retries is greater than the second number of retries, which provides increased reliability when transmitting using the first delivery mode in comparison to the second delivery mode.

In some implementations, the example method 500 also determines whether any streaming clients have fallen behind in the media stream and selectively drops portions of video data when needed (e.g., based on scalability information and/or LTR frame information) For example, the example method 500 can also perform some or all of the operations described for the example method 400.

In some implementations, the example method 500 uses different delivery modes for delivering encoded audio content (e.g., in addition to delivering encoded video content). For example, different delivery modes can be used to provide different levels of reliability (e.g., by adjusting FEC reliability levels of the audio data to be streamed to the streaming clients). The example method 500 can also selectively drops audio content (e.g., in addition to selectively dropping video content). For example, when a streaming client has fallen behind (e.g., based on monitoring a buffer indicating encoded audio content to be delivered to the streaming client), audio content (e.g., redundant audio content) that would otherwise be streamed to the streaming client can be dropped (not transmitted to the streaming client). In some implementations, the selective dropping for audio content is performed by adjusting an FEC reliability level of audio data to be streamed to the streaming client.

Computing Systems

Figure 6:
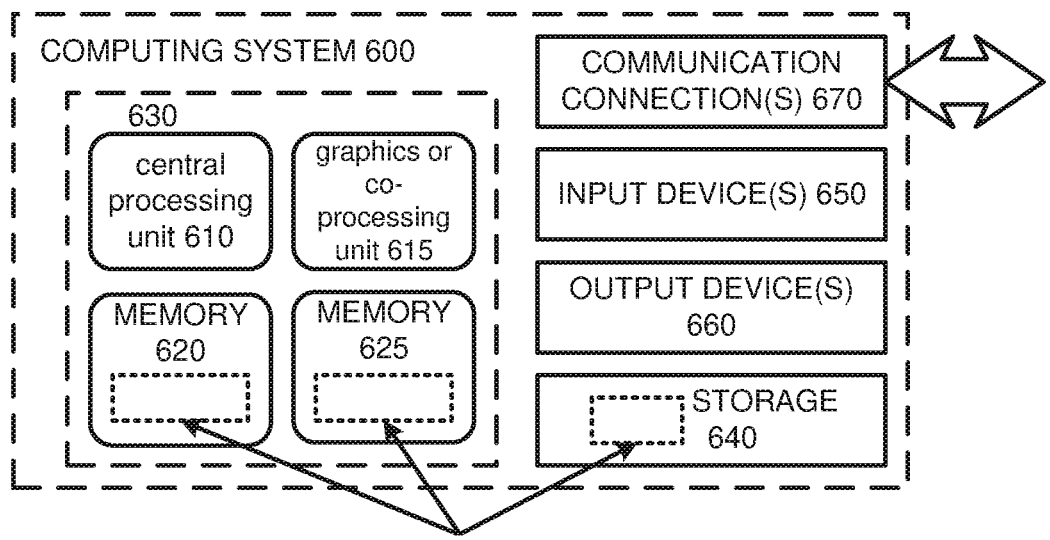
FIG. 6 is a diagram of an example computing system in which some described embodiments can be implemented.

FIG. 6 depicts a generalized example of a suitable computing system 600 in which the described technologies may be implemented. The computing system 600 is not intended to suggest any limitation as to scope of use or functionality, as the technologies may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC), or any other type of processor. A processing unit can also comprise multiple processors. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more technologies described herein, in the form of computer-executable instructions suitable for execution by the processing unit(s).

A computing system may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information and which can be accessed within the computing system 600. The storage 640 stores instructions for the software 680 implementing one or more technologies described herein.

The input device(s) 650 may be a touch input device such as a keyboard, mouse, pen, or trackball, a voice input device, a scanning device, or another device that provides input to the computing system 600. For video encoding, the input device(s) 650 may be a camera, video card, TV tuner card, or similar device that accepts video input in analog or digital form, or a CD-ROM or CD-RW that reads video samples into the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The technologies can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud-Supported Environment

Figure 7:
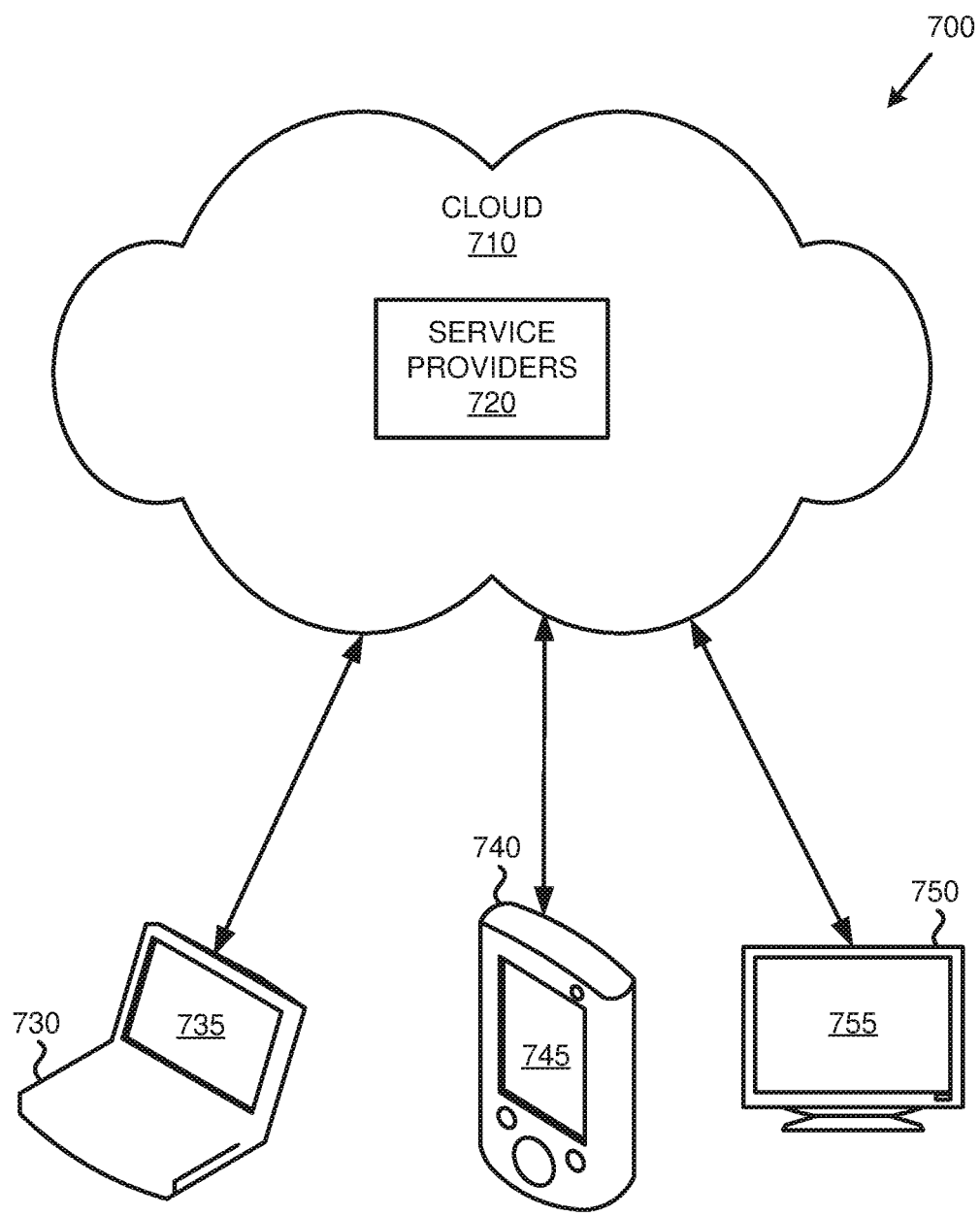
FIG. 7 is an example cloud-support environment that can be used in conjunction with the technologies described herein.

FIG. 7 illustrates a generalized example of a suitable cloud-supported environment 700 in which described embodiments, techniques, and technologies may be implemented. In the example environment 700, various types of services (e.g., computing services) are provided by a cloud 710. For example, the cloud 710 can comprise a collection of computing devices, which may be located centrally or distributed, that provide cloud-based services to various types of users and devices connected via a network such as the Internet. The implementation environment 700 can be used in different ways to accomplish computing tasks. For example, some tasks (e.g., processing user input and presenting a user interface) can be performed on local computing devices (e.g., connected devices 730, 740, 750) while other tasks (e.g., storage of data to be used in subsequent processing) can be performed in the cloud 710.

In example environment 700, the cloud 710 provides services for connected devices 730, 740, 750 with a variety of screen capabilities. Connected device 730 represents a device with a computer screen 735 (e.g., a mid-size screen). For example, connected device 730 could be a personal computer such as desktop computer, laptop, notebook, netbook, or the like. Connected device 740 represents a device with a mobile device screen 745 (e.g., a small size screen). For example, connected device 740 could be a mobile phone, smart phone, personal digital assistant, tablet computer, and the like. Connected device 750 represents a device with a large screen 755. For example, connected device 750 could be a television screen (e.g., a smart television) or another device connected to a television (e.g., a set-top box or gaming console) or the like. One or more of the connected devices 730, 740, 750 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 700. For example, the cloud 710 can provide services for one or more computers (e.g., server computers) without displays.

Services can be provided by the cloud 710 through service providers 720, or through other providers of online services (not depicted). For example, cloud services can be customized to the screen size, display capability, and/or touchscreen capability of a particular connected device (e.g., connected devices 730, 740, 750).

In example environment 700, the cloud 710 provides the technologies and solutions described herein to the various connected devices 730, 740, 750 using, at least in part, the service providers 720. For example, the service providers 720 can provide a centralized solution for various cloud-based services. The service providers 720 can manage service subscriptions for users and/or devices (e.g., for the connected devices 730, 740, 750 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 6, computer-readable storage media include memory 620 and 625, and storage 640. The term computer-readable storage media does not include signals and carrier waves. In addition, the term computer-readable storage media does not include communication connections, such as 670.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A computer system comprising a processor, memory, and a network interface, wherein the computer system implements a streaming service configured to perform operations for low-latency streaming of media content, the operations comprising:

receiving a media stream comprising encoded video data; and streaming the media stream to a plurality of streaming clients via a protocol, wherein the protocol uses a plurality of delivery modes for corresponding different types of the encoded video data, each of the plurality of delivery modes providing a different level of reliability, wherein selective dropping of portions of the encoded video data during the streaming is performed without using per-client quality feedback from the plurality of streaming clients, and wherein the streaming comprises:

transmitting a first type of the encoded video data to the plurality of streaming clients using a first delivery mode among the plurality of delivery modes, wherein the first delivery mode uses up to a first number of retries; and transmitting a second type of the encoded video data to the plurality of streaming clients using a second delivery mode among the plurality of delivery modes, wherein the second delivery mode uses up to a second number of retries different from the first number of retries.

2. The computer system of claim 1, wherein the streaming further comprises:

determining, based only on server-side streaming information, whether any of the plurality of streaming clients has fallen behind in streaming the media stream; and upon determining that a given streaming client, among the plurality of streaming clients, has fallen behind, selectively dropping a given portion among the portions of the encoded video data to be streamed to the given streaming client.

3. The computer system of claim 2, wherein the streaming further comprises:

monitoring one or more buffers indicating a quantity of the encoded video data waiting to be streamed to each of the plurality of streaming clients, wherein the determining whether any of the plurality of streaming clients has fallen behind is based, at least in part, on the monitoring.

4. The computer system of claim 2, wherein, for the given streaming client, the determining checks whether a quantity of the encoded video data waiting to be streamed to the given streaming client is greater than a threshold value.

5. The computer system of claim 2, wherein the given streaming client is associated with a logical buffer of the encoded video data to be streamed to the given streaming client, and wherein, for the given streaming client, the determining checks a location in the logical buffer that indicates how far behind the given streaming client is in the media stream.

6. The computer system of claim 2, wherein the selectively dropping the given portion of the encoded video data is performed by dropping one or more scalability layers.

7. The computer system of claim 2, wherein the selectively dropping the given portion of the encoded video data is performed based on long term reference (LTR) frame dependency structure.

8. The computer system of claim 2, wherein the selectively dropping the given portion of the encoded video data is performed by dropping one or more scalability layers and is also performed based on a long term reference (LTR) frame dependency structure.

9. The computer system of claim 1, wherein the first type of the encoded video data transmitted using the first delivery mode is independent video frames, wherein the second type of the encoded video data transmitted using the second delivery mode is delta video frames, and wherein the first delivery mode provides higher reliability than the second delivery mode.

10. The computer system of claim 1, wherein the first type of the encoded video data transmitted using the first delivery mode is for a first scalability layer, wherein the second type of the encoded video data transmitted using the second delivery mode is for a second scalability layer with higher frame rate, higher spatial resolution, and/or higher quality than the first scalability layer, and wherein the first delivery mode provides higher reliability than the second delivery mode.

11. The computer system of claim 1, wherein the first number of retries is five, and wherein the second number of retries is one.

12. The computer system of claim 1, wherein the streaming further comprises:
transmitting a third type of the encoded video data to the plurality of streaming clients using a third delivery mode, wherein the third delivery mode uses up to a third number of retries different from the first number of retries and different from the second number of retries.

13. In a computer system that implements a streaming service, a method of low-latency streaming of media content, the method comprising:
receiving a media stream comprising encoded video data; and
streaming the media stream to a plurality of streaming clients via a protocol, wherein the protocol uses a plurality of delivery modes for corresponding different types of the encoded video data, each of the plurality of delivery modes providing a different level of reliability, wherein selective dropping of portions of the encoded video data during the streaming is performed without using per-client quality feedback from the plurality of streaming clients, and wherein the streaming comprises:
transmitting a first type of the encoded video data to the plurality of streaming clients using a first delivery mode among the plurality of delivery modes, wherein the first delivery mode uses up to a first number of retries; and
transmitting a second type of the encoded video data to the plurality of streaming clients using a second delivery mode among the plurality of delivery modes, wherein the second delivery mode uses up to a second number of retries different from the first number of retries.

14. The method of claim 13, wherein the streaming further comprises:
determining, based only on server-side streaming information, whether any of the plurality of streaming clients has fallen behind in streaming the media stream; and
upon determining that a given streaming client, among the plurality of streaming clients, has fallen behind, selectively dropping a given portion among the portions of the encoded video data to be streamed to the given streaming client.

15. The method of claim 13, wherein the first type of the encoded video data transmitted using the first delivery mode is independent video frames, wherein the second type of the encoded video data transmitted using the second delivery mode is delta video frames, and wherein the first delivery mode provides higher reliability than the second delivery mode.

16. The method of claim 13, wherein the first type of the encoded video data transmitted using the first delivery mode is for a first scalability layer, wherein the second type of the encoded video data transmitted using the second delivery mode is for a second scalability layer with higher frame rate, higher spatial resolution, and/or higher quality than the first scalability layer, and wherein the first delivery mode provides higher reliability than the second delivery mode.

17. A computer-readable storage media having stored thereon computer-executable instructions for causing a processor, when programmed thereby, to perform operations for low-latency streaming of media content, the operations comprising:
receiving a media stream comprising encoded video data; and
streaming the media stream to a plurality of streaming clients via a protocol, wherein the protocol uses a plurality of delivery modes for corresponding different types of the encoded video data, each of the plurality of delivery modes providing a different level of reliability, wherein selective dropping of portions of the encoded video data during the streaming is performed without using per-client quality feedback from the plurality of streaming clients, and wherein the streaming comprises:
transmitting a first type of the encoded video data to the plurality of streaming clients using a first delivery mode among the plurality of delivery modes, wherein the first delivery mode uses up to a first number of retries; and
transmitting a second type of the encoded video data to the plurality of streaming clients using a second delivery mode among the plurality of delivery modes, wherein the second delivery mode uses up to a second number of retries different from the first number of retries.

18. The computer-readable storage media of claim 17, wherein the streaming further comprises:

determining, based only on server-side streaming information, whether any of the plurality of streaming clients has fallen behind in streaming the media stream; and upon determining that a given streaming client, among the plurality of streaming clients, has fallen behind, selectively dropping a given portion among the portions of the encoded video data to be streamed to the given streaming client.

19. The computer-readable storage media of claim 17, wherein the first type of the encoded video data transmitted using the first delivery mode is independent video frames, wherein the second type of the encoded video data transmitted using the second delivery mode is delta video frames, and wherein the first delivery mode provides higher reliability than the second delivery mode.

20. The computer-readable storage media of claim 17, wherein the first type of the encoded video data transmitted using the first delivery mode is for a first scalability layer, wherein the second type of the encoded video data transmitted using the second delivery mode is for a second scalability layer with higher frame rate, higher spatial resolution, and/or higher quality than the first scalability layer, and wherein the first delivery mode provides higher reliability than the second delivery mode.

* * * * *